US007559081B2

(12) United States Patent
Seidlein

(10) Patent No.: US 7,559,081 B2
(45) Date of Patent: Jul. 7, 2009

(54) METHOD AND APPARATUS FOR AUTHENTICATING A USER AT AN ACCESS TERMINAL

(75) Inventor: Rupert Seidlein, Singapore (SG)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 778 days.

(21) Appl. No.: 10/665,763

(22) Filed: Sep. 18, 2003

(65) Prior Publication Data
US 2005/0066179 A1    Mar. 24, 2005

(51) Int. Cl.
*H04L 9/32* (2006.01)
(52) U.S. Cl. .......................................... 726/9

(58) Field of Classification Search ...................... 726/9
See application file for complete search history.

(56) References Cited

U.S. PATENT DOCUMENTS

| 6,414,635 B1 * | 7/2002 | Stewart et al. | 342/457 |
| 2003/0217151 A1 * | 11/2003 | Roese et al. | 709/225 |
| 2004/0117484 A1 * | 6/2004 | Singer et al. | 709/225 |

* cited by examiner

*Primary Examiner*—Jacob Lipman

(57) ABSTRACT

Secure access to a network resource running on a computer or server, is provided by a method that compares the current physical location of a network access terminal through which a user is attempting to access the network resource, and the current physical location of a mobile terminal on the person of the user who is authorized to access the network resource. If the locations different, then access is denied.

24 Claims, 2 Drawing Sheets

METHOD AND APPARATUS FOR AUTHENTICATING A USER AT AN ACCESS TERMINAL

TECHNICAL FIELD

This invention relates to network security.

BACKGROUND OF THE INVENTION

Before a user is permitted to access a network resource or service provided on a network computer or server through a remote terminal, a network security program or application running on that computer or server, or on a separate computer or server, will generally first determine whether the user is a person who is entitled to access that resource or service. If he is, the network security program or application will attempt to authenticate that person as being the authorized person. Most commonly, the identity aspect is determined through a comparison of a user-inputted account name or identity with the account names or identities of those who are entitled to access the resource or service. If the user-inputted identity or account name is valid, authentication is then generally performed by requiring the user to input a PIN or password that is associated with that identified user and known only to the user and to network security program or application. In many instances, the user will enter both his identity or account name and his PIN or password in two separate fields of a dialog box of a graphical user interface page, for example a WWW page, in order to access a resource or service available on the Internet or some other data network. The network security program or application will allow access to the network resource or service only if the user is able to provide the PIN or password that is uniquely associated with his identity or account name; otherwise, access is denied. This type of interaction is common through terminals such as ATMs (Automatic Teller Machines), laptops, workstations, as well as any other type of landline wired or wireless terminal in which network access is attempted.

As long as a user's PIN or password remains secure, prior art methods of maintaining security using IDs or account names and PINs or passwords have been found to be for the most part satisfactory. A user's PIN or password, however, may be compromised by carelessness on the user's part. For example, a user might notate his ATM card with his PIN number or keep that PIN in his wallet with the ATM card. If the user looses that card or wallet, or if the user's card or wallet is stolen, the finder or thief could have ready access the user's bank account. Similarly, a careless user might leave his PIN or password in plain view near his office terminal, allowing unfettered access by an "eavesdropper" to confidential network resources.

An additional mechanism for authenticating a user would thus be useful to protect access to a restricted network resource or service in order to reduce the likelihood of an unauthorized access by an illegitimate user.

SUMMARY OF THE INVENTION

In accordance with an embodiment of the present invention, secure access to a network resource running on a computer or server, is provided by a method that compares the current physical location of a network access terminal through which a user is attempting to access the network resource, and the current physical location of the user who is authorized to access the network resource. If the locations are different, then access is denied.

In an embodiment of the invention, the physical location of the authorized user is determined by determining the location of a registered mobile terminal that the authorized user is likely to have on or near his person. Such physical location can be determined in response to a location request that is sent to that mobile terminal, which can determine its current physical location using, for example, an internal GPS transceiver or a triangulation methodology. Alternatively, in response to a request received on the access terminal, the user can send a message from that mobile terminal that includes the identity of the registered mobile terminal and its current location to an address that has been specified in the received request. The current physical location of the network access terminal through which access to the network resource or service is being attempted is determined by sending a location request to the terminal, which is equipped with a location-determining device, such as a GPS transceiver, or through a database lookup of such location if the access terminal is located at a fixed location, for example, an ATM. Only if the determined location of the authorized user's registered mobile terminal is the same or within a predetermined range of the location of the terminal through which access is being attempted, is the user granted access to the network resource; otherwise, access is denied.

BRIEF DESCRIPTION OF THE DRAWINGS

The present invention will be better understood from reading the following description of non-limiting embodiments, with reference to the attached drawings, wherein below.

DETAILED DESCRIPTION

Figure 1:
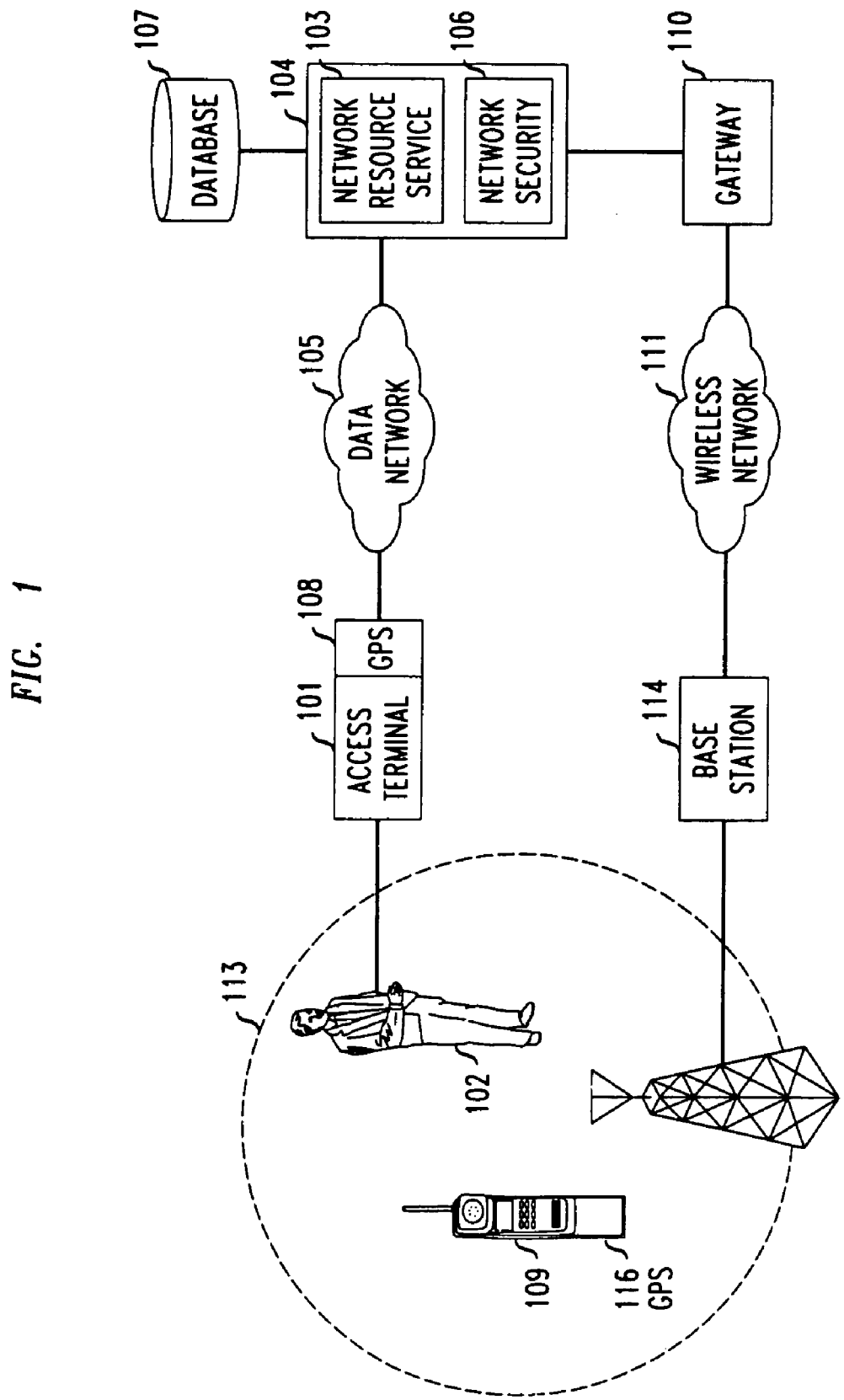
FIG. 1 is a block diagram showing a network incorporating an embodiment of the present invention.

With reference to FIG. 1, using an access terminal 101, a user 102 accesses a network resource or service 103 that is provided on a network computer or server 104, which is connected to a data network 105. Data network 105 can be any type of data network, as for example, an IP network such as the Internet. It can also be any other type of data network running an appropriate protocol. Access terminal 101 can be directly and permanently connected to the network 105, such as an ATM through which the user 102 is able to conduct financial transactions such as withdrawing cash from his bank account. Alternatively, access terminal 101 can be a workstation or a portable device, such as a laptop computer, which is not permanently and directly connected to the network 105, but rather is connected via another network (not shown), such as the landline Public Switched Telephone Network using either a voice-band modem or over a DSL connection, a cable network, a satellite network, or a wireless network.

Regardless of how and over what type of network or networks the connection between terminal 101 and computer or server 104 is established, the user 102 in order to be granted access the desired network resource or service 103 available on computer or server 104 establishes his presence by providing his identity or account name (commonly to be referred to hereinafter in the description and in the claims as the user's ID) to a network security application or program 106 running on the same computer or server 104 or on a different computer or server. Only when user 102 is authenticated by network security application or program 106, is access to the desired network resource or service 103 granted. Generally a network security application or program authenticates a user by comparing the user-inputted ID with a user-inputted PIN or password (commonly to be referred to hereinafter in the description and in the claims as the user's PIN) that is known only to the user and is stored in association with the user's ID in a database 107 that is associated with computer or server 104. If the user-inputted PIN matches the PIN that is stored in database 107 in association with the user's ID, access is granted, and if it doesn't, access is denied. Absent any further authentication mechanism, a network security system that uses only an ID and a PIN for identifying and authenticating a user has no way of determining whether the identity of the user who is attempting access is in fact the actual authorized user. Thus, if the secrecy of a user's PIN is intentionally or accidentally compromised, a network security system will be unable to deny access to any user who is able to provide the authorized user's ID and PIN. Whereas some sophisticated security systems are able to authenticate a person attempting access to a secured facility by analyzing the person's physiognomic characteristics, such as fingerprints or iris patterns, such sophisticated techniques would be extremely costly and difficult to implement at a typical user-computer access terminal such as an ATM or a workstation.

In this described embodiment of the present invention, an additional layer of network security is provided that reduces the likelihood that the person attempting to access the network resource or service 103 available on computer or server 104 is not an authorized user. Specifically, the current physical location of access terminal 101 is compared with the current physical location of the authorized user whose ID has been provided by user 102 to the network security program or application 106 running on computer or server 104. If the determined current location of the actual authorized user matches the determined location of terminal 101, then access to network resource or service 103 is granted based on the likely to be true assumption that if the authorized user is physically at the location of terminal 101, then the user who is attempting access is in fact the authorized user. If, on the other hand, the authorized user is not at the same location as access terminal 101, then the user who is attempting access is not the authorized user, and access is denied.

Authentication of the user commences with an access request through access terminal 101 for the network resource or service 103 provided by computer or server 104. The procedure of the access request generally first consists of obtaining the ID of user 102 via a user interface provided at access terminal 101, where the user interface is typically audio/graphical, but does not need to be restricted to that type of interface. It then consists of routing this request from access terminal 101 over data network 105 to the network security program or application 106. In the case of a fixed access terminal, such as an ATM, the request procedure involves obtaining the identity of access terminal 101 so that it can be provided to the network security program or application 106 in addition to the ID of user 102. Initiating the request by invocation of the user interface can take the form of entering a URL on a user's browser at an access terminal such as a laptop or a workstation. At an ATM, that request can be initiated by inputting an ATM card or credit card in an appropriate slot. Either directly through the inputting of the ATM or credit card, which each have the authorized user's identity embedded in its magnetic strip, or through a responsive request to provide his identity, the user 102 provides either his ID in some manner from which the network security program or application 106 determines whether the provided ID is associated with an authorized user. In most instances the user 102 will also be asked to provide, either in conjunction with his ID or separately, the PIN that is associated with that ID, which is used by the network security program or application 106 as a first level of authentication of user 102.

The second layer of authentication, which is the subject of the present invention, is made by comparing a determined current physical location of the access terminal 101 with a current determined physical location of the authorized user who is associated in database 107 with the ID provided by user 102. The physical location of access terminal 101 is determined by identifying that access terminal and then using that identity to determine where terminal 101 is currently located. The identity of access terminal 101 can be incorporated into the initial request made through access terminal 101 to computer or server 104, or in conjunction with a subsequent response to a request for the user's identity and/or PIN. If access terminal 101 is in a fixed location, such as if it is an ATM, then database 107 has the physical location of that terminal stored in association its identity. Thus, if the physical location is not stored in database 107 in association with the identity of terminal 101, then network security application or program 104 sends a location query to access terminal 101 using a protocol that ensures a secure exchange of information. If not at a permanent location, access terminal 101 is equipped with a location-determining device, such as a GPS transceiver 108. In response to the location query transmitted by computer or server 104 over the data network 105 to the identified access terminal 101, access terminal queries GPS transceiver 108 to determine its current physical location. That location is responsively transmitted back by access terminal 101 to network security program or application 106.

Either before, coincident with, or after transmitting the location query to access terminal 101, a location query is transmitted by network security program 106 to determine the physical location of the authorized user associated with the provided user's ID. In order to determine the current location of the authorized user, the location of a mobile terminal 109 that is associated with that authorized user is determined. Such a mobile terminal 109 will need to be on the user's person or nearby when the user attempts to access the network resource or service 104 that is so protected by the network security program or application that incorporates the present invention. Thus, the identity of that mobile terminal 109, such as its cellular phone number, is registered by the authorized user and stored in database 107 in association with the authorized user's ID.

When user 102 provides his ID, therefore, database 107 is accessed to determine the identity of the authorized user's mobile terminal 109, and network security program or application 106 initiates a location query to that identified mobile terminal 109 to determine its current location. Gateway 110, interconnecting computer or server 104 and wireless network 111 functions to translate between the protocols used on data network 105 and the protocols used on wireless network 111. Using its phone-number identity, mobile terminal 109 is located within the coverage area 113 of a particular base station 114. Using a secure protocol that establishes the identity and authorization of such a query, a location query is transmitted to mobile terminal 109 using a mechanism similar to that of SMS for carrying the query as a short data message. The secure signaling protocol could be incorporated in the SS7 network, but is not restricted to the SS7 network protocols. Mobile terminal 109, running a software program that is adapted to receive a location query and respond thereto, determines its current physical location through an internal or externally connected GPS transceiver 116 or using triangulation from plural base stations, in a well-known manner. The determined current physical location information of mobile terminal 109 is transmitted back over the wireless network 111 and through gateway 110 to the network security program or application 106 using, for example, the SMS mechanism for transmitting a short data message over the SS7 network.

Network security program or application 106 then compares the determined current physical location of the authorized user's registered mobile terminal 109 with the physical location of access terminal 101. If they match or are within a predetermined limited range of one another, access to the network resource or service 104 is granted to user 102 at access terminal 101. If they do not match, then access is denied.

Figure 2:
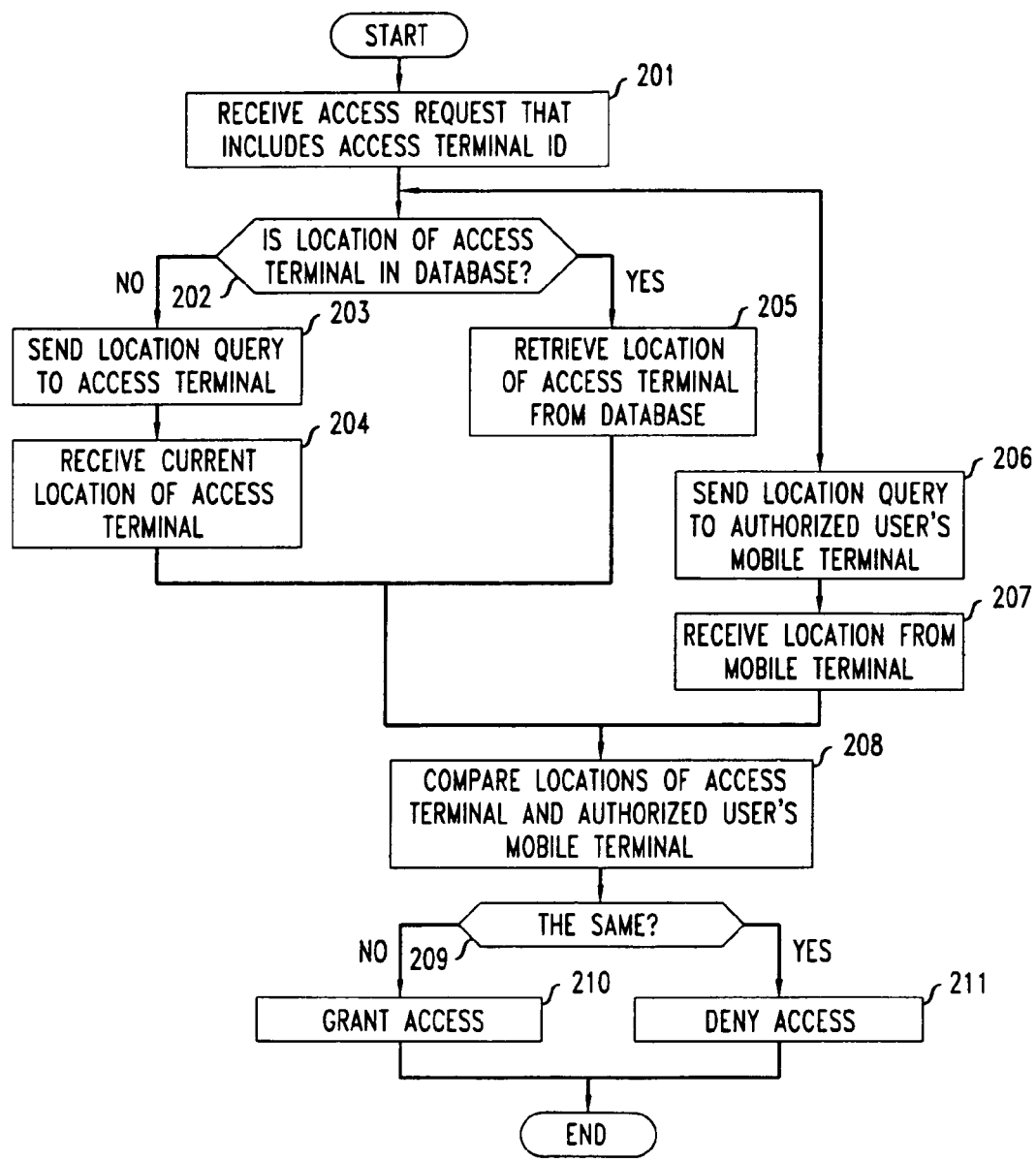
FIG. 2 is a flowchart showing the steps of an embodiment of the present invention.

The flowchart in FIG. 2 summarizes the steps of the above-described procedure followed by the network security application or program in granting or denying access to a network resource or service. At step 201, an access request is received that includes the identity of the terminal from which the request is coming and the ID of the user attempting that access. At step 202 a determination is made whether the location of that identified terminal is stored in an associated database. If not, at step 203, a location query is sent to that access terminal, and at step 204, a response to that location query is received. If there is a location stored in the database in association with that terminal identity then, at step 205, that stored location is retrieved. In parallel with step 202, at step 206, a location query is sent to the registered mobile terminal that is associated with the provided user ID. At step 207, the location of the registered mobile terminal is received in response to that location query. At step 208, the location of the access terminal is compared with the location of the registered authorized user's mobile terminal. At step 209, a determination is made whether or not they are at the same location or within a predetermined small range of one another. If they are, at step 210, access to the network resource or service is granted. If they are not, at step 211, access is denied.

As described above, the user who is attempting access has inputted both his ID and a PIN. If the access terminal is within a secured environment to which the user has already gained access via one or more security clearances and to which only a limited number of other users have access, then the user need not enter a PIN each time he wants to make an access attempt. Specifically, if the location of the mobile terminal associated with the user is determined to be the location of such an access terminal within the secured environment, access can be granted without the additional authentication provided by the PIN.

Although described in terms of a mobile terminal whose location is reported over a wireless network in response to a location query that is received over the wireless network, in other embodiments any type of mobile terminal registered by and associated with and on or near the person of an authorized user can be used to report its current physical location. Such reporting need not be done in response to receiving a wireless location query, but could be incorporated as part of the process of accessing a network resource or service from an access terminal. Thus, after he has provided his ID and PIN, the user could be requested by the network security program or application to send a message from his registered location-determining-enabled terminal to a specified address. That message would include the identity of the registered terminal as well as the current physical location of that terminal. Thus, for example, if the user has registered his GPS-equipped PDA, the user could send a message from that PDA to the specified address, wherein the message includes the PDA's identity and its current location. The network security program or application would then determine if the message received at this address is from the user's registered device and compare its current physical location with the location of the access terminal in order to determine whether to grant or deny access the network resource or service that the user is desirous of reaching. In fact, any type of mobile terminal that can be registered and has the capability of sending its identity and its current location to a specified location can be used.

While the particular invention has been described with reference to illustrative embodiments, this description is not meant to be construed in a limiting sense. It is understood that although the present invention has been described, various modifications of the illustrative embodiments, as well as additional embodiments of the invention, will be apparent to one of ordinary skill in the art upon reference to this description without departing from the spirit of the invention, as recited in the claims appended hereto. Consequently, the method, system and portions thereof and of the described method and system may be implemented in different locations, such as the wireless unit, the base station, a base station controller and/or mobile switching center. Moreover, computer readable media and/or processing circuitry required to implement and use the described system may be implemented in application specific integrated circuits, software-driven processing circuitry, firmware, programmable logic devices, hardware, discrete components or arrangements of the above components as would be understood by one of ordinary skill in the art with the benefit of this disclosure. Those skilled in the art will readily recognize that these and various other modifications, arrangements and methods can be made to the present invention without strictly following the exemplary applications illustrated and described herein and without departing from the spirit and scope of the present invention It is therefore contemplated that the appended claims will cover any such modifications or embodiments as fall within the true scope of the invention.

The invention claimed is:

1. A method for authenticating a user who is attempting access to a network resource or service on a computer or server through an access terminal, the method comprising:
    determining an ID of the user attempting access,
    determining a current physical location of the access terminal;
    determining a current physical location of an identified mobile terminal, the mobile terminal being unassociated with the access terminal, the identity of the mobile terminal being associated with an authorized user who has the determined ID;
    comparing the current physical location of the access terminal with the current physical location of the mobile terminal to verify the location of the authorized user as being within a range of the access terminal; and
    denying or granting access to the network resource or service based on the results of the comparing step.

2. The method of claim 1 wherein if the current physical location of the access terminal and the current physical location of the mobile terminal are within a predetermined range of one another, then access is granted.

3. The method of claim 1 wherein the physical location of the access terminal is determined from a received response to a location query sent to the access terminal.

4. The method of claim 1 wherein the access terminal is at a fixed location that is determined from an identity of that access terminal.

5. The method of claim 1 wherein the physical location of the mobile terminal is determined from a received response to a location query sent to the mobile terminal.

6. The method of claim 1 wherein the physical location of the mobile terminal is determined from a message received from the mobile terminal that is sent by the user.

7. The method of claim 6 wherein the message received from the mobile terminal identifies the current location of the mobile terminal and identity of the mobile terminal.

8. A method at a mobile terminal comprising:

in response to a request, determining a current physical location of the mobile terminal and sending the determined current physical location to a specified location for comparison with a current physical location of an access terminal from which a user is attempting access to a network resource or service and for which the mobile terminal has been identified as being associated with an authorized user of the network resource or service, and to verify the location of the authorized user as being within a range of the access terminal based on the comparison access to the network resource or service is granted or denied, the mobile terminal and the access terminal not being associated.

9. The method of claim 8 wherein the request is received and the response sent over a wireless network.

10. The method of claim 8 wherein the request is received on the access terminal and the response is sent over a wireless network.

11. Apparatus for authenticating a user who is attempting access to a network resource or service on a computer or server through an access terminal, the apparatus comprising:

means for determining an ID of the user attempting access, means for determining a current physical location of the access terminal;

means for determining a current physical location of an identified mobile terminal, the identity of the mobile terminal being associated with an authorized user who has the determined ID, the mobile terminal being unassociated with the access terminal;

means for comparing the current physical location of the access terminal with the current physical location of the mobile terminal to verify the location of the authorized user as being within a range of the access terminal; and means for denying or granting access to the network resource or service based on the comparison.

12. The apparatus of claim 11 wherein access is denied if the current physical location of the access terminal and the current physical location of the mobile terminal are different or not within a predetermined range of one another.

13. The apparatus of claim 11 wherein the physical location of the access terminal is determined from a received response to a location query sent to the access terminal.

14. The apparatus of claim 11 wherein the access terminal is at a fixed location that is determined from the identity of that access terminal.

15. The apparatus of claim 11 wherein the physical location of the mobile terminal is determined from a received response to a location query sent to the mobile terminal.

16. The apparatus of claim 11 wherein the physical location of the mobile terminal is determined from a message received from the mobile terminal that is sent by the user.

17. The apparatus of claim 16 wherein the message received from the mobile terminal identifies the current location of the mobile terminal and identity of the mobile terminal.

18. A computer readable medium tangibly embodying a program of instructions executable by a computer to perform a method for authenticating a user who is attempting access to a network resource or service on a computer or server through an access terminal, the method comprising:

determining an ID of the user attempting access, determining a current physical location of the access terminal;

determining a current physical location of an identified mobile terminal, the identity of the mobile terminal being associated with an authorized user who has the determined ID, the mobile terminal being unassociated with the access terminal;

comparing the current physical location of the access terminal with the current physical location of the mobile terminal to verify the location of the authorized user as being within a range of the access terminal; and denying or granting access to the network resource or service based on the results of the comparing step.

19. The medium of claim 18 wherein the method if the current physical location of the access terminal and the current physical location of the mobile terminal are within a predetermined range of one another, then access is granted.

20. The medium of claim 18 wherein in the method the physical location of the access terminal is determined from a received response to a location query sent to the access terminal.

21. The medium of claim 18 wherein in the method the access terminal is at a fixed location that is determined from an identity of that access terminal.

22. The medium of claim 18 wherein the method the physical location of the mobile terminal is determined from a received response to a location query sent to the mobile terminal.

23. The medium of claim 18 wherein the method the physical location of the mobile terminal is determined from a message received from the mobile terminal that is sent by the user.

24. The medium of claim 23 wherein the method the message received from the mobile terminal identifies the current location of the mobile terminal and identity of the mobile terminal.

* * * * *